June 10, 1930.  W. O. WARNER  1,762,370
CYLINDER AND HEAD CONNECTION FOR INTERNAL COMBUSTION ENGINES
Filed Nov. 14, 1927
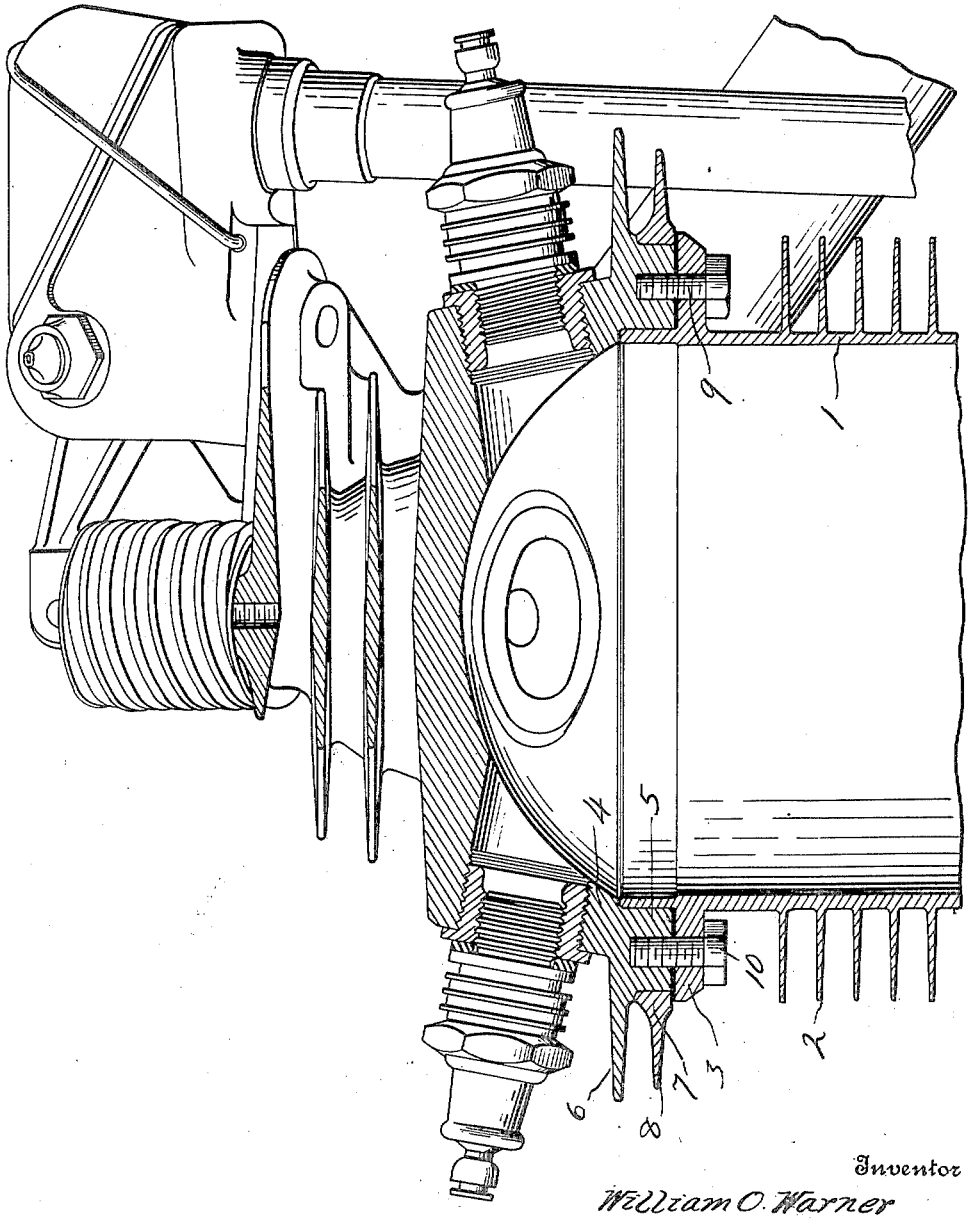
Inventor
William O. Warner
Attorneys Patented June 10, 1930

1,762,370

UNITED STATES PATENT OFFICE

WILLIAM O. WARNER, OF DETROIT, MICHIGAN, ASSIGNOR TO THE WARNER AIRCRAFT CORPORATION, OF DETROIT, MICHIGAN, A CORPORATION OF MICHIGAN

CYLINDER AND HEAD CONNECTION FOR INTERNAL-COMBUSTION ENGINES

Application filed November 14, 1927. Serial No. 233,249.

The invention relates to internal combustion engines and refers more particularly to the connection between a head and a cylinder of an air cooled internal combustion engine. One of the objects of the invention is to provide a construction which may be readily manufactured and assembled and which will maintain a tight joint between the head and cylinder at all times. Another object is to provide a construction which permits of the use of studs for securing the head to the cylinder. With these as well as other objects in view, the invention resides in the novel features of construction and combinations and arrangements of parts as more fully hereinafter set forth.

In the drawings:—

The figure is a sectional elevation through a portion of an internal combustion engine, showing the connection between the head and cylinder embodying my invention.

The internal combustion engine, as illustrated, is of the air cooled high compression type adapted particularly for use in aircraft. 1 is a cylinder of this engine having the transversely extending annular fins 2 and the transversely extending annular flange 3 outwardly beyond these fins. 4 is a cylinder head adapted to be secured to the outer end of the cylinder 1. This head is preferably formed of aluminum or aluminum alloy, while the cylinder is preferably formed of cast iron or steel, the former having an appreciably higher coefficient of expansion than the latter. The head has the sleeve portion 5 which is shrunk upon the outer end of the cylinder 1 beyond the transverse flange 3 and is provided with the transversely extending annular fin 6. To maintain the joint between the sleeve portion and cylinder tight at all times, I have provided the ring 7, which is preferably formed of cast iron or steel, having a lower coefficient of expansion than the head. This ring encircles and is shrunk upon the sleeve portion 5 between the transverse flange 3 and the fin 6 and to facilitate cooling of this ring, there is the transversely extending annular fin 8 extending from the same.

With the construction as thus far described, it will be seen that by heating the head 4 and particularly its sleeve portion 5 and also by heating the ring 7 to proper temperatures, the ring may be sleeved over the sleeve portion of the head and the sleeve portion sleeved over the outer portion of the cylinder, the cylinder being cool at this time. It will also be seen that upon cooling of the sleeve portion and ring the sleeve portion is shrunk upon the cylinder and the ring shrunk upon the sleeve portion. Upon operation of the engine and as the cylinder and head are subjected to increasing temperatures, both have a tendency to expand, but since the sleeve portion has a higher coefficient of expansion and since the ring surrounding the sleeve portion has a lower coefficient of expansion than the sleeve portion and furthermore is not heated to as high a temperature, the sleeve portion is compelled to more tightly grip the outer portion of the cylinder and form a tighter joint. This ring further functions to prevent growth of the sleeve portion as it ages.

With this construction, studs 9 extending transversely of and threaded into the sleeve portion 5 may be used, these studs also extending transversely through the transverse flange 3, and having ends threadedly engaged by the nuts 10 for clamping the head to the cylinder, the expansion of the parts being such that shearing of the studs is avoided.

From the above description, it will be seen that I have provided a connection between a cylinder and a head of an internal combustion engine and particularly an engine of the air cooled type, which may be economically manufactured and assembled and which when assembled provides for a tight joint between the head and cylinder. It will also be seen that my construction enables the use of studs for securing the head to the cylinder, this arrangement permitting the sleeve portion of the head to more firmly grip the studs as the temperature is increased.

What I claim as my invention is:

1. In an internal combustion engine, the combination with a cylinder, of a head of higher coefficient of expansion than said cylinder having a sleeve portion encircling and engaging said cylinder, a ring encircling said sleeve portion for maintaining a tight joint between said sleeve portion and cylinder, and means for securing said head to said cylinder including threaded members extending transversely into said sleeve portion and secured to said cylinder.

2. In an internal combustion engine, the combination with a cylinder having a transverse flange, of a head of higher coefficient of expansion than said cylinder having a sleeve portion encircling and engaging said cylinder, a ring encircling and engaging said sleeve portion, studs secured to said sleeve portion and extending transversely therefrom through said transverse flange, and members upon said studs for clamping said sleeve portion to said transverse flange.

3. In an internal combustion engine, the combination with a cylinder, of a head for said cylinder formed of a material having a substantially higher coefficient of expansion than the material from which said cylinder is formed, said head having an annular portion sleeved on the cylinder, a ring sleeved upon the exterior surface of said annular portion and operable to compel expansion of the annular portion aforesaid inwardly against the cylinder upon operation of the engine, and means extending substantially parallel to the axis of said cylinder for securing said head to the cylinder.

4. In an internal combustion engine, the combination with a cylinder, of a head for said cylinder formed of a material having a substantially higher coefficient of expansion than the material from which said cylinder is formed, said head having an annular portion sleeved on the cylinder, a ring formed of a material having a substantially lower coefficient of expansion than said head and sleeved upon the exterior surface of said annular portion and operable to compel expansion of the annular portion aforesaid inwardly against the cylinder upon operation of the engine, and means carried by the cylinder and engageable with the annular portion aforesaid intermediate the cylinder and ring for securing the head to the cylinder.

In testimony whereof I affix my signature.

WILLIAM O. WARNER.